(12) United States Patent
Chen et al.

(10) Patent No.: US 7,757,054 B2
(45) Date of Patent: Jul. 13, 2010

(54) MEMORY CONTROL SYSTEM AND MEMORY DATA FETCHING METHOD

(75) Inventors: Chien-Chou Chen, Chang Hua (TW); Chi-Chang Lu, Hsinchu (TW)

(73) Assignee: Etron Technology, Inc., Hsin Chu (TW)

( * ) Notice: Subject to any disclaimer, the term of this patent is extended or adjusted under 35 U.S.C. 154(b) by 394 days.

(21) Appl. No.: 12/000,539

(22) Filed: Dec. 13, 2007

(65) Prior Publication Data
US 2008/0294855 A1 Nov. 27, 2008

(30) Foreign Application Priority Data
May 21, 2007 (TW) .............................. 96117945 A

(51) Int. Cl.
*G06F 13/00* (2006.01)
(52) U.S. Cl. ........................ 711/154; 710/52; 710/71; 711/101; 711/103; 711/157; 711/170
(58) Field of Classification Search ............... 710/52, 710/71
See application file for complete search history.

(56) References Cited

U.S. PATENT DOCUMENTS 5,134,702 A * 7/1992 Charych et al. ............... 710/71
6,400,291 B1 * 6/2002 Sankey ......................... 341/100
7,191,262 B2 * 3/2007 Sleeman ........................ 710/62
2006/0059537 A1 * 3/2006 Alvermann et al. ............ 726/1
2009/0259786 A1 * 10/2009 Lin et al. ..................... 710/110
2009/0259789 A1 * 10/2009 Kato et al. .................... 710/308

* cited by examiner

*Primary Examiner*—Pierre-Michel Bataille
*Assistant Examiner*—Sean Rossiter
(74) *Attorney, Agent, or Firm*—Muncy, Geissler, Olds & Lowe, PLLC

(57) ABSTRACT

The invention discloses a memory control system and a method to read data from memory. The memory control system comprises a microprocessor, a serial storage device, a first buffer, a second buffer, a memory control unit, and a multiplexer. The memory control system and the method to read data from memory according to the invention utilize the characteristics that the microprocessor reads data from continuous addresses of a serial memory during most of the time. By reading in advance and temporarily storing the data that the microprocessor requests to read, increasing the reading memory speed can be achieved.

9 Claims, 9 Drawing Sheets

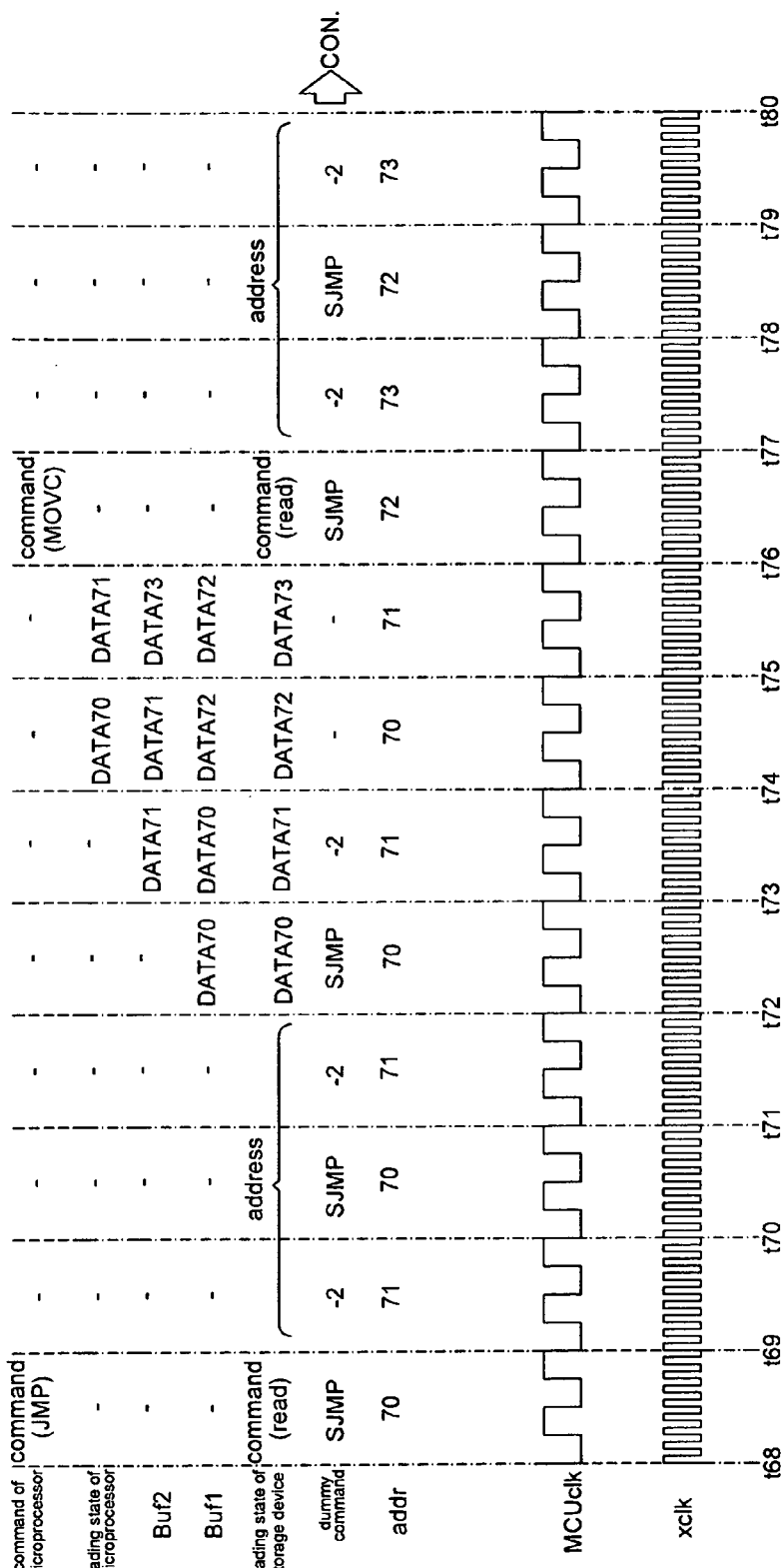

MEMORY CONTROL SYSTEM AND MEMORY DATA FETCHING METHOD

BACKGROUND OF THE INVENTION (a) Field of the Invention

The invention relates to a memory processing device, particularly to a memory control system and a method to read data from memory.

(b) Description of the Related Art

In general, a microprocessor (MCU) has no build-in read-only memory (ROM) and in the past the microprocessor usually reads ROM codes from an externally coupled read-only memory (such as: flash memory) via a parallel bus. Since the current design trend is to integrate the microprocessor and scaler into a single chip, in order to reduce the pin count of the microprocessor, a serial bus is utilized to read the ROM code from the read-only memory. Under the serial bus structure, the microprocessor can only read one single bit of the data within one base band clock when reading the ROM codes from the read-only memory. Therefore, the processing speed of the microprocessor is seriously reduced.

For example, FIG. 1 illustrates the waveform diagram of a two-period (2T) microprocessor in serial transmitting operation. As shown in the figure, the label "MCUclk" indicates the processing clock of the microprocessor and the label "xclk" indicates the clock of the system base band. In general, the 2T microprocessor fetches one byte of data from the read-only memory during the first period T0 of the MCUclk and executes the one byte of data during the second period T1 of the MCUclk. However, in order to fetch and execute eight bits of data, the 2T microprocessor must firstly spend time to decode an eight-bit command and a twenty-four-bit address. As shown in the figure, when fetching or executing the ROM code, the 2T microprocessor needs to spend forty base band clocks xclk to complete an operation, that is, the 2T microprocessor needs eighty base band clocks xclk to complete fetching and executing one byte of data. In general, one command of the microprocessor needs one to four bytes of data. Taking a two-byte command as an example, a 2T microprocessor needs four MCUclks, that is, a hundred and sixty clocks xclk to complete the operation is needed. Therefore, under the serial transmission structure, the time needed for various microprocessors (2T, 6T, 8T MCU, and so forth) to execute one command is greatly extended and the program executing speed of the overall system is limited.

BRIEF SUMMARY OF THE INVENTION

In light of the above-mentioned problem, one object of the invention is to provide a memory control system and a method for reading data in memory to increase the speed of reading serial memory for the microprocessor.

One embodiment of the invention provides a memory control system. The memory control system comprises a microprocessor, a serial storage device, a first buffer, a second buffer, a memory control unit, and a multiplexer. The microprocessor outputs a plurality of addresses and the plurality of addresses comprises at least a first address and a second address or a third address. The serial storage device stores data corresponding to the plurality of addresses. The first buffer temporarily stores a first data or a third data. The second buffer temporarily stores a second data. The memory control unit receives the first address to read the first data corresponding to the first address from the storage device according to the first address; and receives the second address to read the second data corresponding to the second address from the storage device according to the second address; or receives the third address to read the third data corresponding to the third address from the storage device according to the third address. The memory control unit generates a select signal when the first and the second buffer both contain data. The multiplexer receives the first data and the second data or the third data and decides how to output the first data, the second data, or the third data to the microprocessor according to the select signal. It should be noted that, when the microprocessor begins reading data from the storage device during the initiating stage of the microprocessor, the memory control unit provides at least one dummy command to delay the microprocessor for a third duration until the first buffer contains the first data and the second buffer contains the second data. When the first address and the second address are arrayed in continuous order, the multiplexer outputs the first data during a first duration and the second data during a second duration according to the select signal. When the first address and the second address are not arrayed in continuous order, the memory control unit provides at least one dummy command to delay the microprocessor for a third duration until the first buffer contains the third data and the second buffer contains the second data.

Furthermore, one embodiment of the invention provides a method for reading data in memory. The method comprises the following steps. At first, a first address, a second address, and a third address are received. Then, it is determined if the first address and the second address are arrayed in continuous order. When the first address and the second address are arrayed in continuous order, the first data and the second data corresponding to the first address and the second address from memory, respectively, are read and temporarily stored and the first data and the second data are sequentially outputted to the microprocessor. On the other hand, when the first address and the second address are not arrayed in continuous order, a dummy command is provided to delay the microprocessor for a pre-determined duration, and the second data and the third data corresponding to the second address and the third address, respectively, from the memory are read and temporarily stored within the pre-determined duration, and the second data and the third data are sequentially outputted to the microprocessor.

The memory control system and the method for reading data from memory according to the invention utilize the attribute that a microprocessor reads data from continuous addresses of the serial memory for most of the time. By pre-reading and temporarily storing the data requested by the microprocessor to read, speeding up the reading memory efficiency can be achieved.

BRIEF DESCRIPTION OF THE DRAWINGS

FIGS. 6A, 6B, and 6C show schematic diagrams illustrating the special read mode of the memory control system according to another embodiment of the invention.

DETAILED DESCRIPTION OF THE INVENTION

The memory control system and the method to read data from memory according to the invention are described in details with reference to the drawings.

Figure 1:
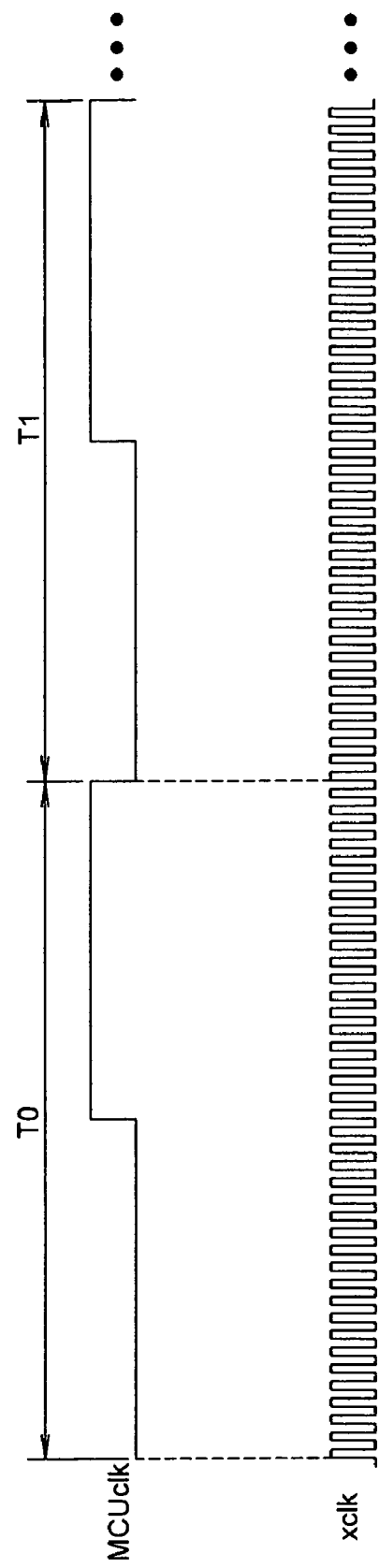
FIG. 1 shows a schematic diagram illustrating the waveform chart of a two-period (2T) microprocessor in serial transmitting operation.
Figure 2:
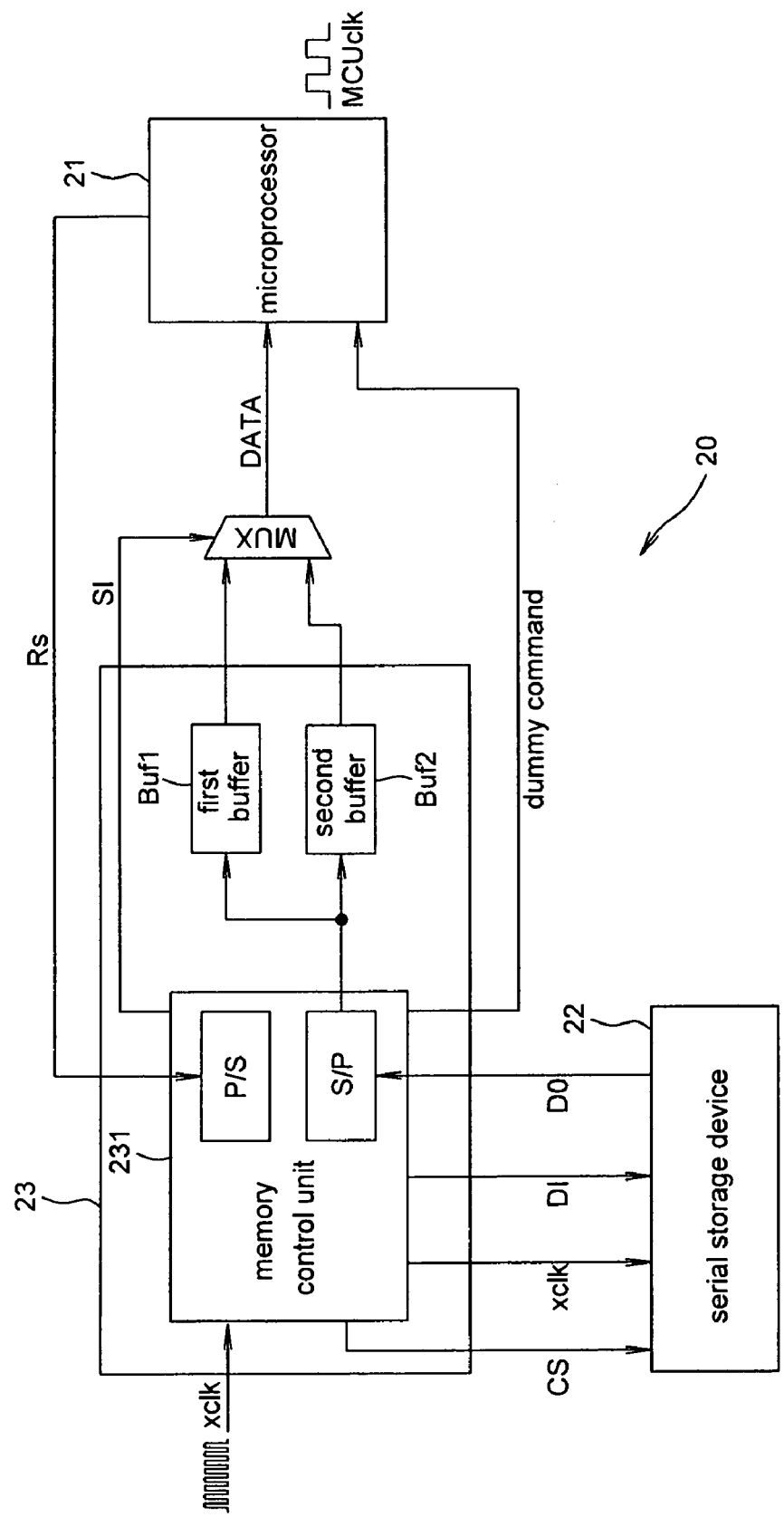
FIG. 2 shows a schematic diagram illustrating a memory control system according to one embodiment of the invention.

FIG. 2 shows a schematic diagram illustrating a memory control system 20 according to one embodiment of the invention. The memory control system 20 comprises a microprocessor 21, a serial storage device 22, a memory master 23, and a multiplexer MUX.

The microprocessor 21 can be the current two-period 2T, four-period 4T, six-period 6T, or more-T microprocessor control unit (MCU) or microprocessor unit (MPU); or various microprocessor control units (MCU) or microprocessors (MPU) to be developed in future. According to the requirement of the arithmetical operation, the microprocessor 21 is used to generate a read signal Rs, comprising at least one address datum. Obviously, the read signal Rs can also comprises other data, such as command and so forth.

The serial storage device 22 is used to store data (ROM code) corresponding to the address requested to be read by the microprocessor and it utilizes the base band clock xclk of the system during its operation. The serial storage device 22 may be a serial read-only memory, such as a serial flash read-only memory, or other serial memory; currently available or other serial memories to be developed in future.

The operation of the memory master 23 utilizes the base band clock xclk of the system for operation. The memory master 23 is used to read data, corresponding to the plurality of addresses, from the storage device 22 according to the plurality of addresses provided by the read signals Rs from the microprocessor 21 at different timings. The memory master 23 comprises a first buffer Buf1, a second buffer Buf2, a memory control unit 231, a parallel-to-serial converting unit P/S, and a serial-to-parallel converting unit S/P. The first buffer Buf1 and the second buffer Buf2 are both for temporarily storing data (ROM code) corresponding to the above-mentioned addresses. The parallel-to-serial converting unit P/S converts the parallel input signal from the microprocessor 21 into the serial output signal. While the serial-to-parallel converting unit S/P converts the serial input data from the storage device 22 into the parallel output data for supplying to the buffer Buf1 or Buf2. It should be noted that, when both of the buffer Buf1 and the buffer Buf2 contain the ROM code, the memory control unit 231 will generate a select signal S1.

Furthermore, the multiplexer MUX is used to receive data from the buffer Buf1 or Buf2 and determine how to output the plurality of data to the microprocessor 21 according to the select signal S1.

It should be noted that, when the first address, the second address, and the subsequent third, the fourth, . . . addresses sequentially requested to read by the microprocessor 21 are arrayed in continuous order (for example, the second address is equal to the first address plus one), the memory control unit 231 and the serial storage device 22 enter into the continuous read mode. That is, the memory control unit 231 utilizes the select signal S1 to control the multiplexer MUX for outputting, in turn (in rotation), data stored in the buffers Buf1 and Buf2 corresponding to the plurality of addresses. When the addresses of the first address and the second address that the microprocessor 21 requests sequentially to read are not arrayed in continuous order (for example, the second address is equal to the first address plus n (n is a positive integer and n>1), the memory control unit 231 and the serial storage device 22 enter the special read mode. The special read mode is the processing mode of changing the address reading sequence from the storage device 22 for the microprocessor 21, for example, the process of executing commands, such as: jump JMP, interrupt INT, move MOVC, and so forth.

On the other hand, as shown in FIG. 2, the label DI indicates data, such as command, address, and so forth that the memory control unit 231 inputs to the storage device 22; the label DO indicates the ROM code that the storage device 22 outputs to the S/P converting unit; and the label CS indicates the drive signal that the memory control unit 231 uses to select which storage device 22 to use when there are a plurality of storage devices 22.

The followings are the detail description of the operation of the memory control system 20, operating in continuous read mode according to one embodiment of the invention.

Figure 3:
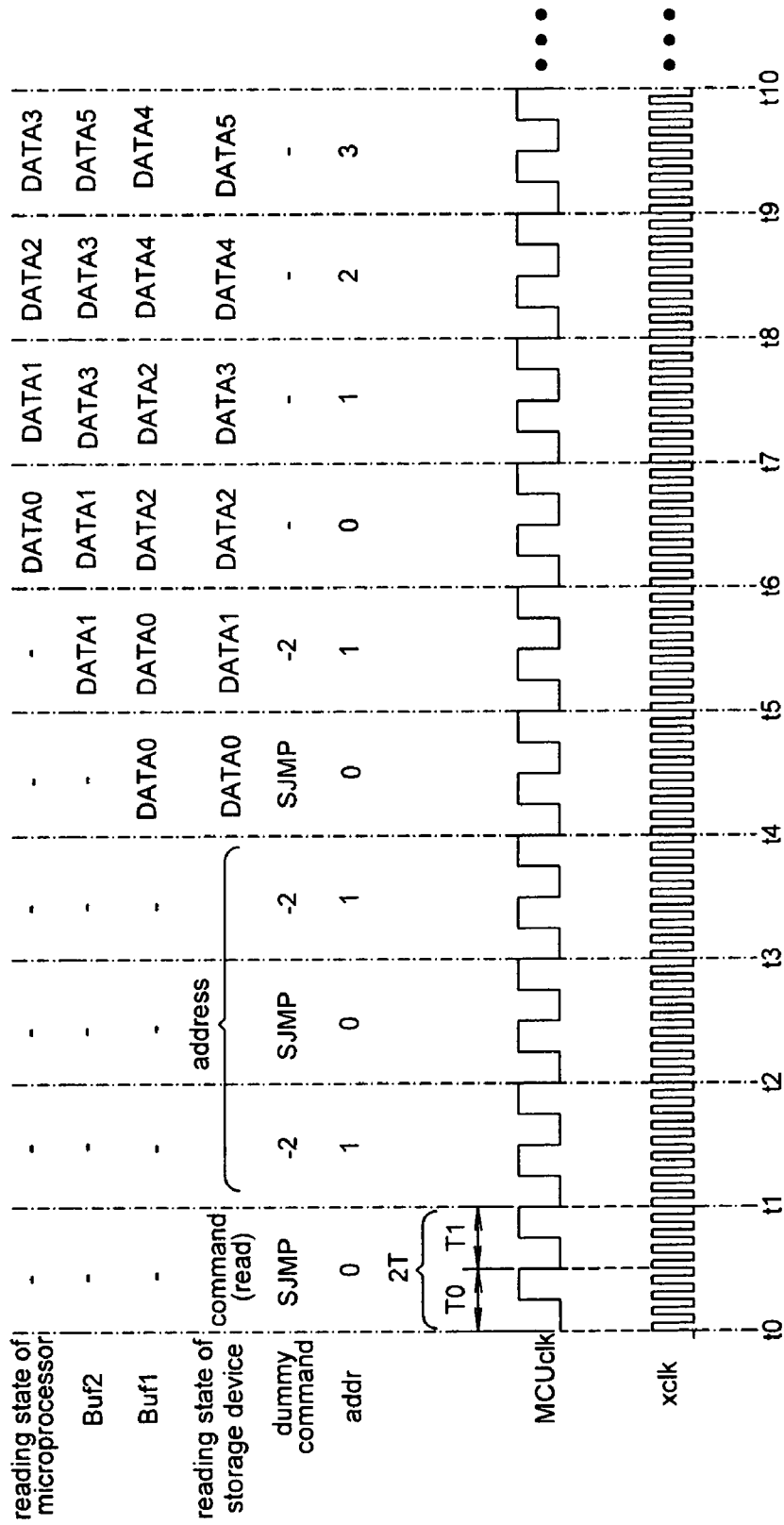
FIG. 3 shows a schematic diagram illustrating the waveforms of the processing clock of the microprocessor and the system base band clock; and the operating status of various devices in the memory control system, under continuous read mode, according to one embodiment of the invention.

FIG. 3 shows a schematic diagram illustrating the waveforms of the processing clock of the microprocessor and the system base band clock; and the operating status of various devices of the memory control system, under continuous read mode, according to one embodiment of the invention. As shown in the figure, the label MCUclk indicates the processing clock of the microprocessor 21; the label xclk indicates the clock of the base band of the system. It should be noted that the time required for processing one bit is one xclk, when the storage device 22 transmits data. It is assumed that the microprocessor 21 is a two-period (2T) microprocessor in this embodiment of the invention. Therefore, the time required for the microprocessor to complete fetching and executing data with one byte size is two MCUclks T0+T1=2T, that is eight xclks. Thus, the executing speed of the microprocessor 21 is xclk/4.

Referring to FIGS. 2, 3, it is assumed that the microprocessor 21 needs to read the data DATA0, DATA1, DATA2, and so forth, corresponding to the continuous addresses 0, 1, 2, and so forth from the storage device 22. Of course, the continuous addresses read by the microprocessor 21 are not limited to the above-mentioned example. On the other hand, in order to simplify the description, details description about the conversion of the P/S converting unit and the S/P converting unit will not be given herein.

At first, at the time t0, the microprocessor 21 outputs the read signal Rs of a read address 0 to the memory control unit 231 to request for fetching the data DATA0, corresponding to the address 0, from the storage device 22. Under the current structure, when the microprocessor 21 reads data for the first time, the storage device 22 needs eight xclks to decode the eight-bit (one byte) command in the read signal Rs (at the time t0~t1), and twenty-four xclks (at time t1~t4) to decode twenty-four bits (3 byte) of the address information in the read signal Rs. Then, the storage device 22 must read the data DATA0 of the address 0 and send the data DATA0 to the first buffer Buf1 through the S/P converting unit, at the time t4~t5. Thereafter, the storage device 22 reads the data DATA1 of the address 1 and sends the data DATA1 to the second buffer Buf2 through the S/P converting unit at the time t5~t6. Therefore, the storage device 22 takes the time between t0~t6 to complete the above-mentioned data preparation activities before finishing the preparation of the data DATA1 to be supplied to the microprocessor 21. The total time required to prepare DATA0 and DATA1 is forty-eight xclks, which is equal to 48/8=6 bytes processing time.

According to one embodiment of the invention, when the data DATA1 is not ready, the memory master 23 of the memory control system 20 will issue the dummy command that consumes six byte processing time to the microprocessor 21 to delay the timing for the microprocessor 21 to receive data, in order to speed up the overall system processing speed and to maintain the synchronization between the microprocessor 21 and the storage device 22. As shown in FIG. 3, during the time t0~t6, while the data DATA0 and DATA1 are not ready, the memory control unit 231 issues a total of three short jump commands SJMP-2 to the microprocessor 21, so that the address issued by the microprocessor 21 resets back to 0 until the initial data DATA0 and DATA1 areready. The short jump command SJMP occupies one byte and the command -2 that causes the counter of the microprocessor 21 to step back two steps occupies one byte. Therefore, the three SJMP-2s consume a total of six bytes processing time.

The followings are the detail description of the operation of the memory control system 20 incorporating with the dummy command:

Please refer to FIGS. 2, and 3. At the time t0: where the address of the counter (not shown in the figure) of the microprocessor 21 is 0. At the time t0~t1: the memory control unit 231 issues the first dummy command SJMP to the microprocessor 21 while the storage device 22 decodes the command of the read signal Rs, and automatically increases the address of the counter from 0 to 1 for the next step.

At the time t1: where the address of the counter (not shown in the figure) of the microprocessor 21 is 1. The memory control unit 231 issues the first -2 command to the microprocessor 21. At the time t1~t2: the microprocessor 21 processes the first -2 command while the storage device 22 decodes the address data of the read signal Rs. Also, the counter of the microprocessor 21 automatically increases the address to 2, but the microprocessor 21 also decreases the address 2 of the counter by 2 according to the first -2 command to thereby obtain the address 0.

At the time t2: the memory control unit 231 issues the second dummy command SJMP to the microprocessor 21. At the time t2~t3: the storage device 22 continues to decode the address data of the read signal Rs, and automatically increases the address of the counter from 0 to 1.

At the time t3: the memory control unit 231 issues the second -2 command to the microprocessor 21. At the time t3~t4: the microprocessor 21 processes the second -2 command and automatically increases the address to 2, but the microprocessor 21 also decreases the address 2 of the counter by 2 according to the first -2 command to thereby obtain the address 0 while the storage device 22 continues to decode the address data of the read signal Rs.

At the time t4: the memory control unit 231 issues the third dummy command SJMP to the microprocessor 21. At the time t4~t5: the address of the counter (not shown in the figure) of the microprocessor 21 is 0 and automatically increases the address of the counter from 0 to 1. By now, the storage device 22 has completed decoding the address information of the read signal Rs, reads the data DATA0 according to the address 0 in the read signal Rs and transmits the data DATA0 to the buffer Buf1 thorough the S/P converting unit.

At the time t5: the memory control unit 231 issues the third -2 command to the microprocessor 21. At the time t5~t6: the microprocessor 21 processes the third command -2 and automatically increases the address to 2, but the microprocessor 21 also decreases the address 2 of the counter by 2 according to the first -2 command to thereby obtain the address 0. At the same time, the storage device 22 reads the data DATA1 according to the address 1 (that is, the address 1 of the counter of the microprocessor 21) of the read signal Rs and transmits the data DATA1 to the buffer Buf2 through the S/P converting unit. By now, the data are completely ready and the multiplexer MUX receives the data DATA0 and DATA1 at the same time.

Subsequently, at the time t6~t7: since both of the buffers Buf1, Buf2 contain data, the memory control unit 231 then generates the select signal S1 to the multiplexer MUX. The multiplexer MUX outputs the data DATA0, corresponding to the address 0, from the buffer Buf1 to the microprocessor 21 according to the select signal S1. At the same time, the memory control unit 231 continues to read the data DATA2 of the next address 2 of the storage device 22 and outputs to the buffer Buf1. Therefore, the buffer Buf1 contains DATA2 and the buffer Buf2 contains DATA1.

At the time t7~t8: as both of the buffers Buf1, Buf2 contain data, the memory control unit 231 generates the select signal S1 to the multiplexer MUX. The multiplexer MUX outputs the data DATA1, corresponding to the address 1, from the buffer Buf2 to the microprocessor 21 according to the select signal S1. At the same time, the memory control unit 231 continues to read the data DATA3 of the next address 3 of the storage device 22 and outputs to the buffer Buf2. Now, the buffer Buf1 contains DATA2 and the buffer Buf2 contains DATA3.

At the time t8~t9: as both of the buffers Buf1, Buf2 contain data, the memory control unit 231 generates the select signal S1 to the multiplexer MUX. The multiplexer MUX outputs the data DATA2, corresponding to the address 2, from the buffer Buf1 to the microprocessor 21 according to the select signal S1. At the same time, the memory control unit 231 continues to read the data DATA4 of the next address 4 of the storage device 22 and outputs to the buffer Buf1. Therefore, the buffer Buf1 contains DATA4 and the buffer Buf2 contains DATA3. As the operation thereafter are similar to those at the time t8~t9, the process can be in the same manner as the above.

Thus, in continuous read mode, the storage device 22 can increase the speed of supplying data to the microprocessor 21 by utilizing the alternating operation of the buffers Buf1 and Buf2. The processing speed that the overall system can achieve is approximately xclk/4 after the extension of the processing time. Thus, the problem of slow processing speed of the overall system in the prior art can be solved.

It should be noted that, if the microprocessor 21 is maintained under the mode of reading data from continuous addresses completely, the processing speed of the memory control system 20 according to the invention will be very fast and the above-mentioned speed of approaching xclk/4 can be achieved. However, in practical applications, the microprocessor 21 still encounters the special situations of reading data of discrete addresses. The plurality of special situations is classified as the above-mentioned special processing mode of the microprocessor 21. In order to resolve the possible asynchronous problem between the storage device 22 and the microprocessor 21 that may result from the plurality of special situations, the following three examples about the operation of the special read mode of the memory control system 20 are described in detail according to one embodiment of the invention. Of course, the practical applications are not limited to the following three examples. It can be understand by those who are skilled in the art that other situations in reading data of discrete addresses can also be solved by the minor modifications of the techniques according to the invention. The claims of the invention also comprise these solving methods.

Figures 4A, 4B:
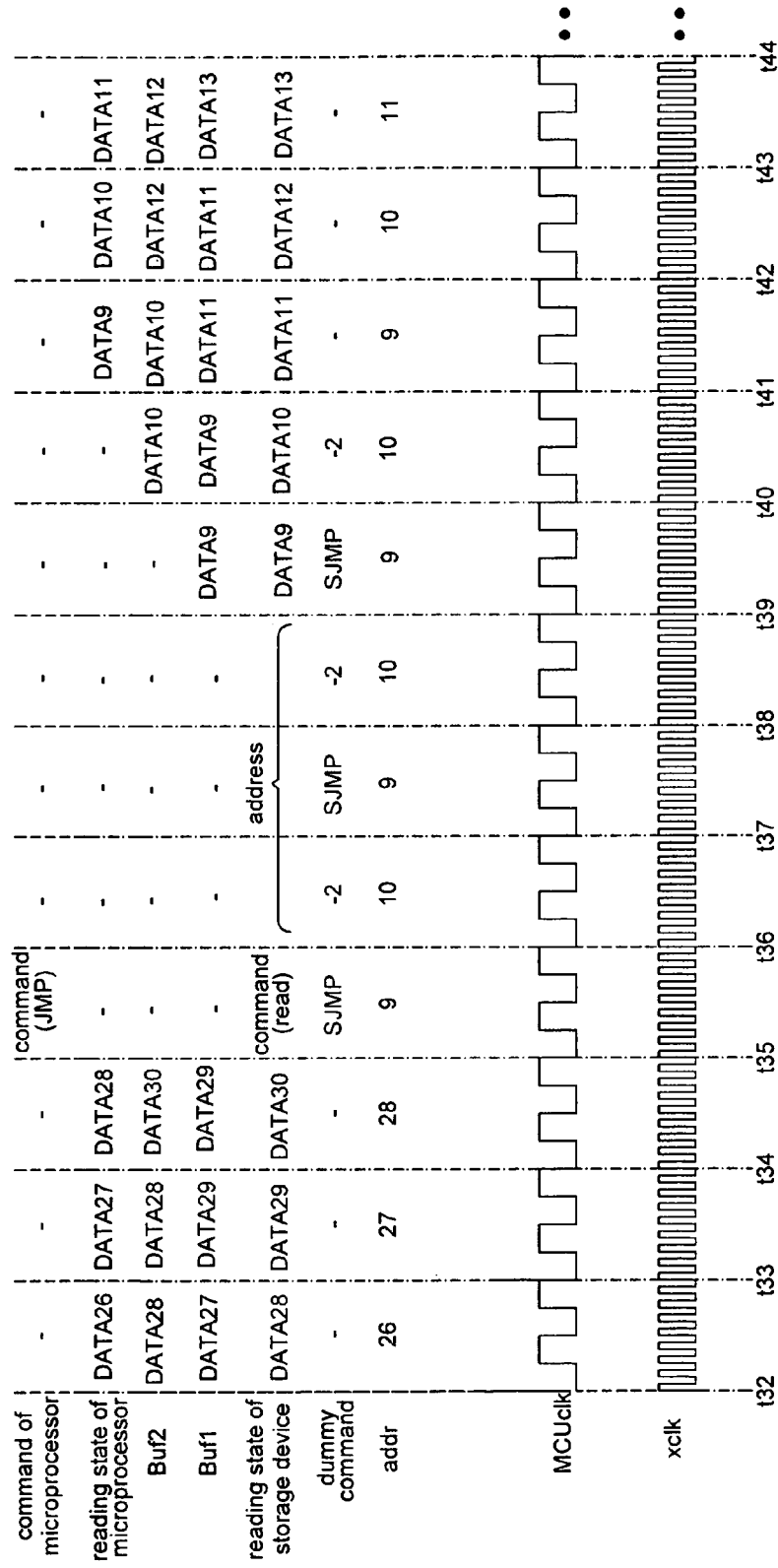
FIGS. 4A and 4B show schematic diagrams illustrating a special read mode of the memory control system according to one embodiment of the invention.

FIGS. 4A and 4B show the special read mode of the memory control system 20 according to one embodiment of the invention. As shown in FIG. 4A, it is assumed that the microprocessor 21 requires changing to read the data of the addresses 9, 10, 11, and so forth after reading data of the continuous addresses (till 26, 27, or 28) for a period of time. Thus, at the time t35, the microprocessor 21 issues a read signal Rs comprising the jump command JMP and the read address 9 to the memory control unit 231 for requesting to change the read address from the address 28 to the discrete address 9. Then, the memory control unit 231 and the storage device 22 enter the special read mode. Under the special read mode as shown in FIG. 4B, in order to keep the normal operation of the microprocessor 21 to prevent interruption, the memory control unit 231 issues three short jump commands SJMP-2 to the microprocessor 21 at the time t35~t41 so that the addresses issued by the microprocessor 21 are repeatedly to be 9 and 10 until data of the data DATA9 and DATA10, corresponding to the addresses 9 and 10, respectively, are ready. During the time t35~t41, the microprocessor 21 is delayed for the time of processing six bytes so that the storage device 22 can prepare the data in advance to output the data DATA9, DATA10, and DATA11 corresponding to the addresses 9, 10, and 11 requested by the microprocessor 21, at the times t41~t42, t42~t43, and t43~t44, respectively. Hence, the microprocessor 21 can still synchronize with the storage device 22 when reading data of discrete addresses.

Figures 5A, 5B:
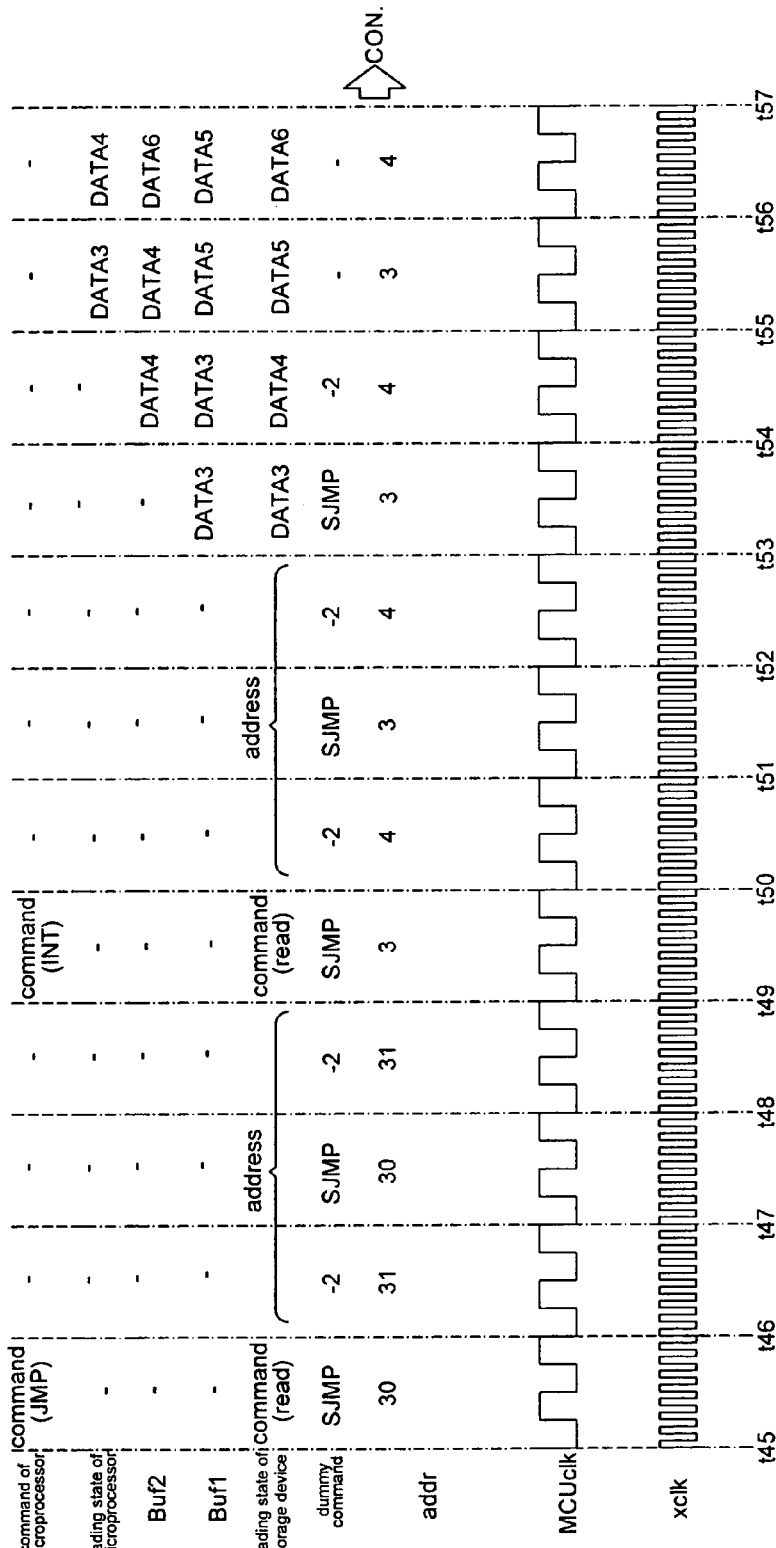
FIGS. 5A, 5B, and 5C show schematic diagrams illustrating the special read mode of the memory control system according to another embodiment of the invention.
Figure 5C:
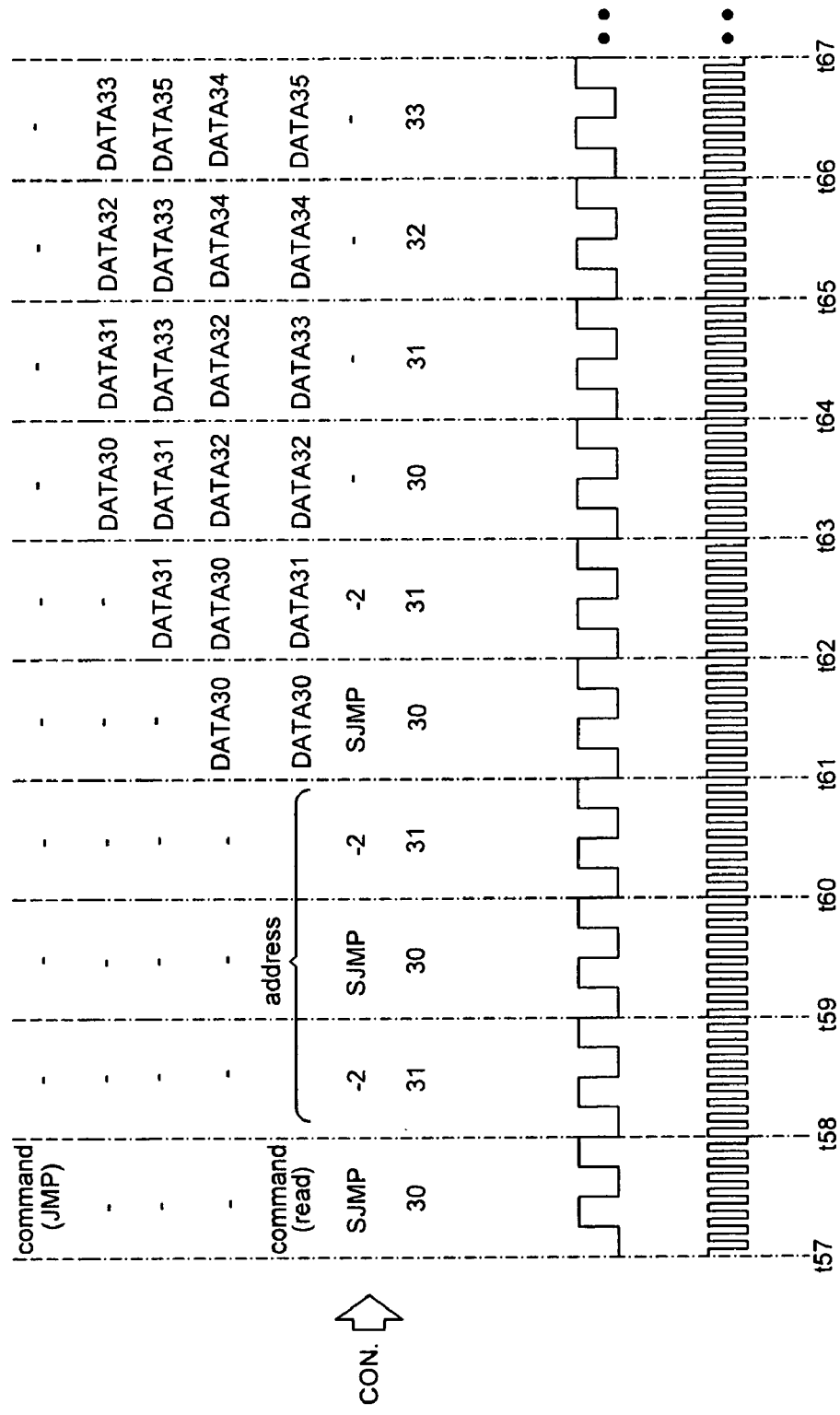

FIGS. 5A, 5B, and 5C show the special read mode of the memory control system 20 according to another embodiment of the invention. As shown in FIG. 5A, it is assumed that the microprocessor 21 is to jump to the address 30 when executing the short jump command JMP; and the microprocessor 21 issues the interrupt command INT for reading the data corresponding to the addresses 3 and 4 due to the requests from other devices, during executing the command JMP. Then, the memory control unit 231 and the storage device 22 also enter the special read mode.

Under the special read mode as shown in FIGS. 5B and 5C, at the time t45, the memory control unit 231 receives the read signal Rs, comprising the jump command JMP and the address 30, issued by the microprocessor 21 and issues the dummy command SJMP-2 to the microprocessor 21, according to the read signal RS, for delaying the speed of the microprocessor 21 so that there is enough time for the storage device 22 to read the data of the addresses 30 and 31. However, during the time t45~t49 of processing the jump command, the microprocessor 21 issues the interrupt command INT for preferentially reading the data of addresses 3 and 4. Hence, the memory control unit 231 issues three dummy commands SJMP-2 at the time t49~t55 according to the command INT to delay the speed of the microprocessor 21 so that the storage device 22 completes the preparation of the data corresponding to the addresses 3 and 4. Hence, the storage device 22 synchronizes with the microprocessor 21 at the time t55~t56 and t56~t57 to output the data DATA3 and DATA4, separately. Thereafter, at the time t57, the microprocessor 21 returns to continue reading the data of the address 30, automatically. Hence, during the time t57~t63, the memory control unit 231 issues three dummy commands SJMP-2 similarly for the storage device 22 to prepare the data of the addresses 30 and 31 so that the storage device 21 can output synchronously the data corresponding to the addresses 30, 31, 32, and 33 to the microprocessor 21 at the time t63~t64, t64~t65, t65~t66, and t66~t67, separately.

Figure 6C:
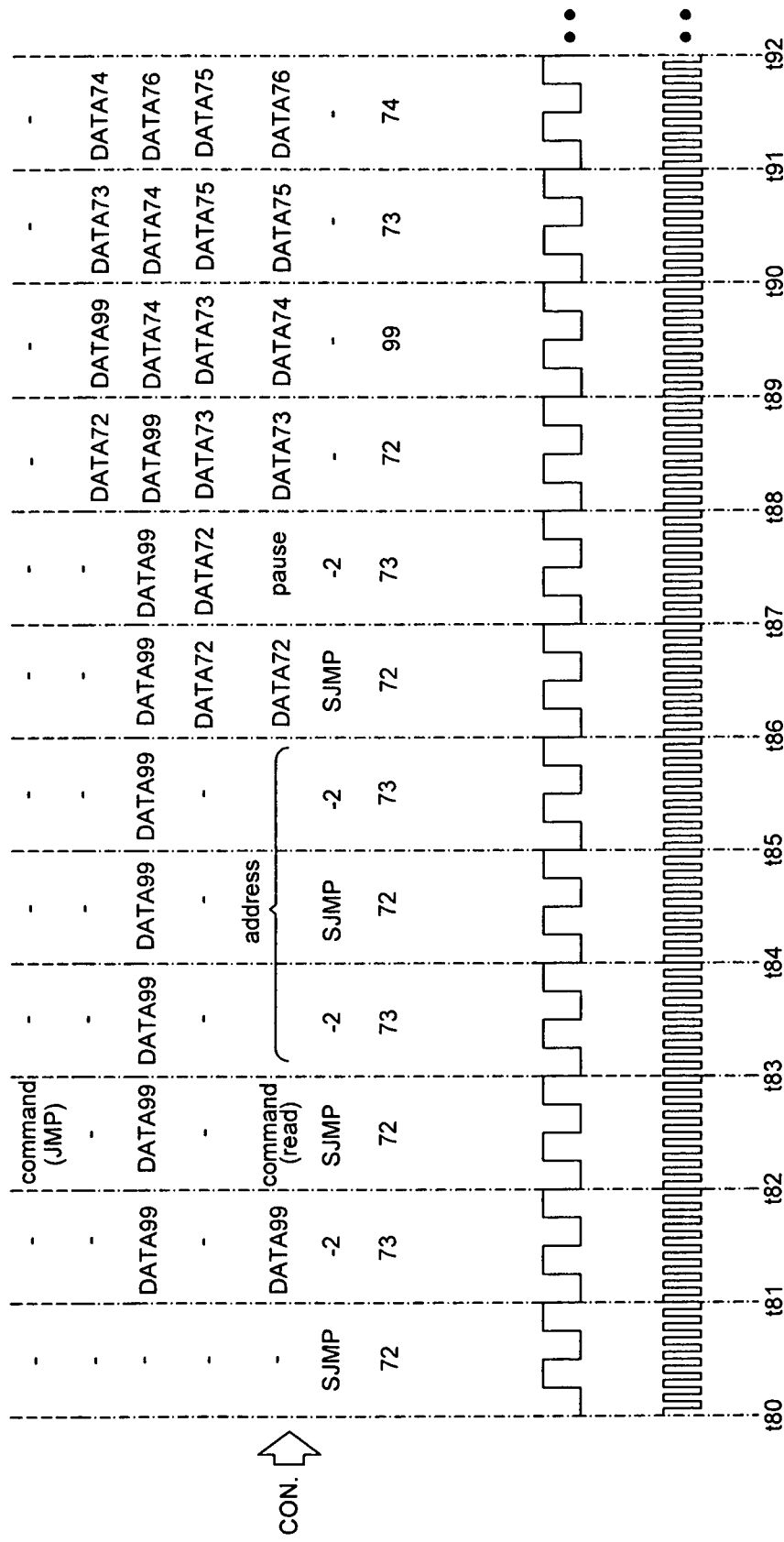

FIGS. 6A, 6B, and 6C show the special read mode of the memory control system 20 according to another embodiment of the invention. As shown in FIG. 6A, it is assumed that the microprocessor 21 is to jump to address 70 when executing the jump command JMP; and the microprocessor 21 issues the move command MOVC for reading the data corresponding to the address 99 of the external memory, due to other requests, while reading the data of addresses 70 and 71. Then, the memory control unit 231 and the storage device 22 also enter the special read mode. Under the special read mode as shown in FIGS. 6B and 6C, at the time t76, the microprocessor 21 issues the move command MOVC for reading the data of the address 99 of the external memory. At the time, the counter of the microprocessor 21 is still at the address 72. At the same time (at the time t76), the memory control unit 231 starts to issue the dummy command SJMP-2 to the microprocessor 21 for delaying the time of the microprocessor 21 until the time t81~t82 when the storage device 22 has read the data DATA99 of the address 99 and outputs the DATA99 to the buffer Buf2 for temporarily storing. At the time t82~t83, the microprocessor 21 returns to continue reading the data of the address 72. Hence, at the time t82~t88, the memory control unit 231 issues the dummy commands SJMP-2 continuously to the microprocessor 21 for delaying the time of the microprocessor 21. It should be noted that at the time t82~t88 the data of DATA99 will not be deleted and the buffer Buf2 will continue temporarily storing the data. At the time t86~t87, the storage device 22 reads the data DATA72 of the address 72 and outputs the DATA72 to the buffer Buf1 for temporarily storing. At the time t87~88, the memory control unit 231 temporarily pauses the clock xclk of the storage device 22 so that the storage device 22 stops reading or outputting any data at this time. Thus, the data of the buffer Buf2 will not be changed and is still the data DATA99.

Thereafter, at the time t88~t89, as both of the buffers Buf1, Buf2 contain data, the memory control unit 231 generates the select signal S1 for supplying to the multiplexer MUX. The multiplexer MUX outputs the data DATA72 of the address 72 to the microprocessor 21 according to the select signal S1, while the storage device 22 reads the data of the next address 73 and outputs to the buffer Buf1. Next, at the time t89~t90, because the setting of the MOVC command, the reading address for the microprocessor 21 becomes 99. The multiplexer MUX outputs the data of the address 99 from the buffer Buf2 to the microprocessor 21 according to the select signal S1. At the same time, the storage device 22 reads the data DATA74 of the address 74 next to the original address 73 to be temporarily stored in the buffer Buf2. Subsequently, at the time t90~t91 and t91~t92, the microprocessor 21 returns to the continuous read mode and operates synchronously with the storage device 22. Thus, the microprocessor 21 reads the data DATA73 and DATA74, separately.

In conclusion, even under the special read mode to read various discrete addresses, the memory control system 20 according to the invention can still keep operating in synchronization with the storage device 22. Generally, during most of the operations, the microprocessor is to read continuous addresses. Therefore, compared to the prior art, the memory control system according to the invention makes the storage device and the microprocessor operate synchronously under any situation to read the data of ROM code faster.

Figure 7:
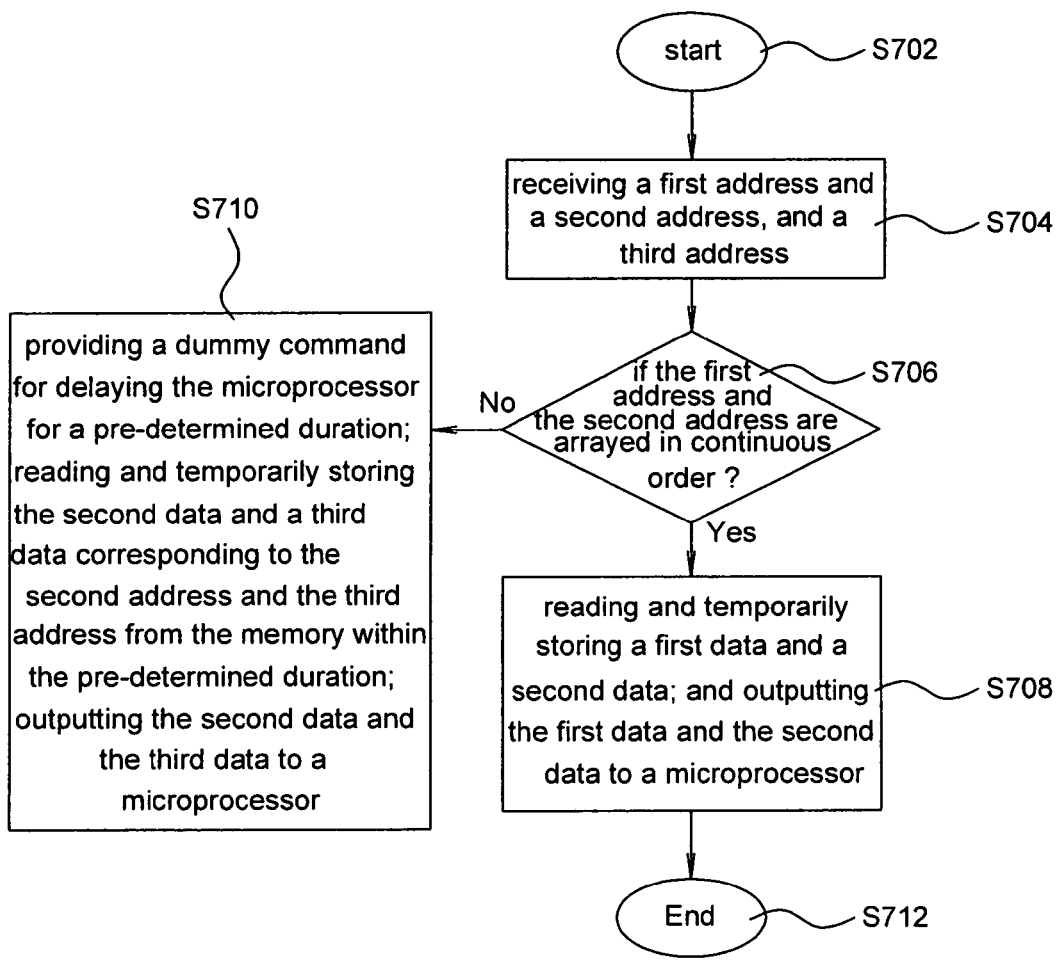
FIG. 7 shows a flow chart illustrating the method for reading data in memory according to one embodiment of the invention.

Furthermore, FIG. 7 shows the flow chart of the method for reading memory data according to one embodiment of the invention. The method comprises the following steps:

Step S702: start;

Step S704: receiving a first address and a second address, and a third address;

Step S706: determining if the first address and the second address are arrayed in continuous order, jumping to Step S708 if yes, and jumping to Step S710 if no;

Step S708: reading and temporarily storing a first data and a second data, corresponding to the first address and the second address, from the memory; and outputting the first data and the second data to a microprocessor, sequentially;

Step S710: providing a dummy command for delaying the microprocessor for a pre-determined duration; reading and temporarily storing the second data and a third data corresponding to the second address and the third address from the memory within the pre-determined duration and outputting the second data and the third data to a microprocessor, sequentially;

Step S712: End.

It should be noted that the above-mentioned memory can be a serial read-only memory or a serial flash read-only memory. The above-mentioned data can be read-only memory code (ROM Code).

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A memory control system, comprising:
 a microprocessor for outputting a plurality of addresses, wherein the plurality of addresses comprises at least a first address and a second address, and optionally a third address;
 a storage device for storing data corresponding to the plurality of addresses;
 a first buffer for temporarily storing a first data or a third data;
 a second buffer for temporarily storing a second data;
 a memory control unit for receiving the first address to read a first data corresponding to the first address from the storage device and for receiving the second address to read a second data corresponding to the second address from the storage device or for receiving the third address to read a third data corresponding to the third address from the storage device; wherein the memory control unit generates a select signal when both of the first and the second buffers contain any of the above mentioned data; and
 a multiplexer for receiving the first data and the second data or the third data and outputting the first data, the second data, or the third data to the microprocessor according to the select signal,
 wherein the multiplexer outputs the first data during a first duration and the second data during a second duration according to the select signal, when the first address and the second address are arrayed in continuous order,
 wherein the memory control unit provides at least one dummy command to delay the microprocessor for a third duration until the first buffer stores the first data and the second buffer stores the second data, when the microprocessor starts to read the data from the storage device during the initiating stage of the microprocessor, and
 wherein the memory control unit provides at least one dummy command to delay the microprocessor for a third duration until the first buffer stores the third data and the second buffer stores the second data, when the first address and the second address are not arrayed in continuous order.

2. The memory control system according to claim 1, wherein the storage device is a serial type read-only memory or a serial type flash read-only memory.

3. The memory control system according to claim 1, wherein the storage device decodes the command and the address outputted by the microprocessor and reads the first data and the second data during the third duration.

4. The memory control system according to claim 1, wherein the storage device decodes the command and the address outputted by the microprocessor and reads the second data and the third data during the third duration.

5. The memory control system according to claim 1, further comprising a parallel-to-serial converting unit to convert the plurality of addresses, that are inputted in parallel, into serial output.

6. The memory control system according to claim 1, further comprising a serial-to-parallel converting unit to convert the plurality of data, that are inputted in serial, into parallel output.

7. The memory control system according to claim 1, wherein the data are read-only memory codes.

8. A method to read data from memory, comprising:
 receiving a first address, a second address, and a third address;
 determining if the first address and the second address are arrayed in continuous order in the memory;
 reading and temporarily storing a first data and a second data corresponding to the first address and the second address, respectively, from the memory when the first address and the second address are arrayed in continuous order and outputting the first data and the second data to a microprocessor sequentially; and
 providing a dummy command to delay the microprocessor for a pre-determined time, reading and temporarily storing the second data and the third data corresponding to the second address and the third address, respectively, from the memory within the pre-determined time when the first address and the second address are not arrayed in continuous order, and outputting the second data and the third data to the microprocessor sequentially.

9. The method according to claim 8, wherein the memory is a serial type read-only memory or a serial flash read-only memory and the data are read-only memory codes.

* * * * *